United States Patent
Peoples et al.

(10) Patent No.: US 8,577,924 B2
(45) Date of Patent: Nov. 5, 2013

(54) DETERMINING BASE ATTRIBUTES FOR TERMS

(75) Inventors: Bruce E. Peoples, State College, PA (US); Michael R. Johnson, State College, PA (US); Michael M. Smith, Aaronsburg, PA (US)

(73) Assignee: Raytheon Company, Waltham, MA (US)

( * ) Notice: Subject to any disclaimer, the term of this patent is extended or adjusted under 35 U.S.C. 154(b) by 908 days.

(21) Appl. No.: 12/335,213

(22) Filed: Dec. 15, 2008

(65) Prior Publication Data

US 2010/0153367 A1 Jun. 17, 2010

(51) Int. Cl.
*G06F 17/30* (2006.01)
*G06F 7/00* (2006.01)

(52) U.S. Cl.
USPC .......................................... 707/794; 707/803

(58) Field of Classification Search
USPC ................................................ 707/794, 803
See application file for complete search history.

(56) References Cited

U.S. PATENT DOCUMENTS

| | | | |
|---|---|---|---|
| 4,964,063 A | 10/1990 | Esch | |
| 6,169,986 B1 | 1/2001 | Bowman et al. | |
| 6,263,335 B1 | 7/2001 | Paik et al. | |
| 6,523,028 B1 | 2/2003 | DiDomizio et al. | |
| 6,678,677 B2 | 1/2004 | Roux et al. | |
| 6,847,979 B2 | 1/2005 | Allemang et al. | |
| 7,031,909 B2 | 4/2006 | Mao et al. | |
| 7,139,755 B2 | 11/2006 | Hammond | |
| 7,225,183 B2 | 5/2007 | Gardner | |
| 7,428,529 B2 | 9/2008 | Zeng et al. | |
| 7,539,619 B1 * | 5/2009 | Seligman et al. | 704/277 |
| 7,555,472 B2 | 6/2009 | Craig et al. | |
| 7,685,118 B2 | 3/2010 | Zhang | |
| 7,761,298 B1 | 7/2010 | Pereira et al. | |
| 7,853,555 B2 | 12/2010 | Peoples et al. | |
| 7,882,143 B2 | 2/2011 | Smyros et al. | |
| 7,991,608 B2 | 8/2011 | Johnson et al. | |
| 2002/0002454 A1 | 1/2002 | Bangalore et al. | |
| 2002/0022955 A1 | 2/2002 | Troyanova et al. | |
| 2002/0022956 A1 | 2/2002 | Ukrainczyk et al. | |
| 2002/0107844 A1 | 8/2002 | Cha et al. | |
| 2002/0111941 A1 | 8/2002 | Roux et al. | |
| 2003/0028367 A1 | 2/2003 | Chalabi | |
| 2003/0049592 A1 | 3/2003 | Park | |

(Continued)

OTHER PUBLICATIONS

Rodriguez et al.; "Determining Semantic Similarity among Entity Classes from Different Ontologies;" IEEE Transactions on Knowledge and Data Engineering, vol. 15, No. 2; Mar./Apr. 2003; pp. 442-456.

(Continued)

*Primary Examiner* — Kuen Lu
(74) *Attorney, Agent, or Firm* — Daly, Crowley, Mofford & Durkee, LLP

(57) ABSTRACT

In one embodiment, a method for determining concept attributes for a concept term includes receiving a concept term and determining one or more word senses for the concept term. A word sense is selected from the one or more word senses, and, based on the selected word sense, one or more conceptually similar terms for the concept term is determined. The method also includes determining that at least one of the one or more conceptually similar terms is a concept attribute for the concept term and generating a mapping to associate the concept attribute with the concept term. The mapping is stored in an onomasticon.

20 Claims, 4 Drawing Sheets

(56) References Cited

U.S. PATENT DOCUMENTS

| | | |
|---|---|---|
| 2003/0050915 A1 | 3/2003 | Allemang et al. |
| 2003/0177000 A1 | 9/2003 | Mao et al. |
| 2003/0229497 A1 | 12/2003 | Wilson et al. |
| 2004/0024739 A1 | 2/2004 | Copperman et al. |
| 2004/0067471 A1 | 4/2004 | Bennett |
| 2004/0093328 A1 | 5/2004 | Damle |
| 2004/0107088 A1 | 6/2004 | Budzinski |
| 2004/0236729 A1 | 11/2004 | Dingledine et al. |
| 2005/0278325 A1 | 12/2005 | Mihalcea et al. |
| 2006/0074832 A1 | 4/2006 | Gardner et al. |
| 2006/0184516 A1 | 8/2006 | Ellis |
| 2006/0235843 A1 | 10/2006 | Musgrove et al. |
| 2007/0005343 A1 | 1/2007 | Sandor et al. |
| 2007/0136251 A1 | 6/2007 | Colledge et al. |
| 2007/0250493 A1 | 10/2007 | Peoples et al. |
| 2007/0294223 A1 * | 12/2007 | Gabrilovich et al. ............. 707/3 |
| 2008/0033932 A1 | 2/2008 | DeLong et al. |
| 2008/0270120 A1 | 10/2008 | Pestian et al. |
| 2008/0270138 A1 | 10/2008 | Knight et al. |
| 2009/0012928 A1 | 1/2009 | Lussier et al. |
| 2009/0063473 A1 | 3/2009 | Van Den Berg et al. |
| 2009/0089047 A1 | 4/2009 | Pell et al. |
| 2009/0171876 A1 | 7/2009 | Tirri |
| 2009/0254543 A1 | 10/2009 | Ber et al. |
| 2009/0259459 A1 | 10/2009 | Ceusters et al. |
| 2010/0070449 A1 | 3/2010 | Arnold et al. |
| 2010/0115003 A1 | 5/2010 | Soules et al. |
| 2010/0121884 A1 | 5/2010 | Peoples et al. |
| 2010/0153092 A1 | 6/2010 | Peoples et al. |
| 2010/0153368 A1 | 6/2010 | Peoples et al. |
| 2010/0153369 A1 | 6/2010 | Peoples et al. |
| 2010/0161669 A1 | 6/2010 | Peoples et al. |
| 2010/0223276 A1 | 9/2010 | Al-Shameri et al. |
| 2010/0287179 A1 | 11/2010 | Peoples et al. |
| 2011/0040774 A1 | 2/2011 | Peoples et al. |

OTHER PUBLICATIONS

File downloaded from PAIR for U.S. Appl. No. 12/266,671, filed Nov. 7, 2008, file through Jan. 7, 2013, Part 1, 513 pages.
File downloaded from PAIR for U.S. Appl. No. 12/266,671, filed Nov. 7, 2008, file through Jan. 7, 2013, Part 2, 616 pages.
File downloaded from PAIR for U.S. Appl. No. 12/266,724, filed Nov. 7, 2008, file through Jan. 7, 2013, Part 1, 382 pages.
File downloaded from PAIR for U.S. Appl. No. 12/266,724, filed Nov. 7, 2008, file through Jan. 7, 2013, Part 2, 415 pages.
File downloaded from PAIR for U.S. Appl. No. 12/342,580, filed Dec. 23, 2008, file through Jan. 11, 2013, Part 1, 532 pages.
File downloaded from PAIR for U.S. Appl. No. 12/342,580, filed Dec. 23, 2008, file through Jan. 11, 2013, Part 2, 181 pages.
File downloaded from PAIR for U.S. Appl. No. 12/335,239, filed Dec. 15, 2008, file through Jan. 11, 2013, 112 pages.
File downloaded from PAIR for U.S. Appl. No. U.S. Pat. App. No. 12/335,260, filed Dec. 15, 2008, 557 pages.
File downloaded from PAIR for U.S. Appl. No. 12/335,283, filed Jan. 16, 2009, 616 pages.
File downloaded from PAIR for U.S. Appl. No. 12/541,244, filed Aug. 14, 2009, 659 pages.

* cited by examiner

DETERMINING BASE ATTRIBUTES FOR TERMS

TECHNICAL FIELD

This invention relates generally to the field of information management and, more specifically, to formal concept analysis.

BACKGROUND

Formal concept analysis is a principled process for automatically deriving an ontology from a collection of objects and their properties. Formal concept analysis is useful for information management, for example in intelligence or information systems.

SUMMARY OF THE DISCLOSURE

Improved methods, techniques, and/or systems for improving concept analysis, such as by defining objects and properties, may be needed in certain situations. In accordance with the disclosure, disadvantages and problems associated with previous techniques for concept analysis may be reduced or eliminated.

According to one embodiment, a method for determining concept attributes for a concept term includes receiving a concept term and determining one or more word senses for the concept term. A word sense is selected from the one or more word senses, and, based on the selected word sense, one or more conceptually similar terms for the concept term is determined. The method also includes determining that at least one of the one or more conceptually similar terms is a concept attribute for the concept term and generating a mapping to associate the concept attribute with the concept term. The mapping is stored in an onomasticon.

According to another embodiment, a system for determining concept attributes for a concept term includes a memory and logic stored in a computer readable medium. When executed by a computer configured to receive a concept term, one or more word senses for the concept term is determined. A word sense is selected from the one or more word senses and one or more conceptually similar terms for the concept term is identified based on the selected word sense.

Certain embodiments may provide one or more technical advantages. A technical advantage of some embodiments may include providing concept attributes for concept terms as a basis for formal concept analysis to semantically disambiguate linguistic concept terms. Certain embodiments allow for determining a base concept attribute for linguistic concept terms. Certain embodiments provide for more accurate determinations of concept attributes.

In addition, certain embodiments may provide for expanding concept attributes in determining the validity of concept types. A technical advantage of some embodiments may provide for expanding terms that represent concept attributes for concept types. Some embodiments may provide improved accuracy in expanding concept attributes. Moreover, certain embodiments may provide automated methods and systems for the described purposes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5, like numerals being used for like and corresponding parts of the various figures.

Figure 1:
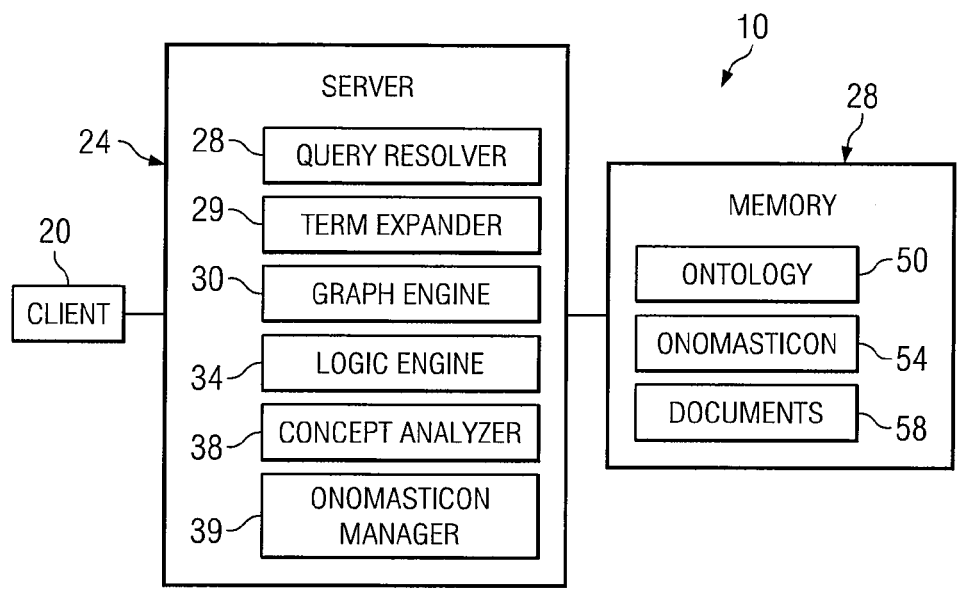
FIG. 1 illustrates one embodiment of a system operable to determine and/or expand attributes.

FIG. 1 illustrates an embodiment of a system operable to determine and/or expand attributes for formal concept analysis. In certain embodiments, system 10 determines, and/or expands terms, such as concept terms, term representations, and/or concept attributes. In certain embodiments, system 10 may determine one or more concept attributes for concept terms for formal concept analysis. In certain embodiments, system 10 may expand terms that represent a concept attributes for concept terms. Certain embodiments of system 10 may map, evaluate, store, or otherwise utilize determined or expanded terms. Certain embodiments generate matrices mapping concept attributes to concept terms, referred to as "attribute clusters." Certain embodiments may generate matrices mapping concept types to term representations for the concept types, referred to as "concept type clusters." In certain embodiments, system 10 may perform formal concept analysis on terms utilizing attribute and concept type clusters, and utilizing clustering techniques associated with Galois lattice analysis tools.

In the illustrated embodiment, system 10 includes a client 20, a server 24, and a memory 28. Server 24 includes query resolver 28, term expander 29, graph engine 30, a logic engine 34, a concept analyzer 38, and an onomasticon manager 39. Memory 28 includes an ontology 50, an onomasticon 54, and documents 58.

In particular embodiments, client 20 may send input to system 10 and/or receive L output from system 10. In certain embodiments, client 20 may be a remote client communicating with system 10 through a network. In particular examples, a user may use client 20 to send input to system 10 and/or receive output from system 10. In particular embodiments, client 20 may provide output, for example, display, print, or vocalize output, reported by server 24. In particular embodiments, client 20 may send an input to system 10 comprising any suitable message comprising one or more terms that may be used to search for additional terms. A term may comprise any suitable sequence of characters, for example, one or more letters, one or more numbers, and/or one or more other characters. An example of a term is a word.

Server 24 stores logic (for example, software and/or hardware) that may be used to perform the operations of system 10. In the illustrated example, server 24 includes attribute query resolver 28, term expander 29, graph engine 30, a logic engine 34, a concept analyzer 38, and an onomasticon manager 39.

In particular embodiments, term expander 29 may generate or expand one or more concept terms by identifying a set of terms related to an input, such as a seed term or concept term.

Term expander 29 may use an ontology 50 (which may include, for example, WordNet®, a knowledge base, a cognitive model, or a psychological model) to identify conceptually similar terms, attributes, relationships, and/or word senses to identify conceptually similar terms (CSTs), concept attributes, word senses, and/or relationships. In certain embodiments, term expander 29 may access mappings for a term in onomasticon 54.

Conceptually similar terms are terms that are, for example, within the semantic context of each other. Conceptually similar terms are applicable to various terms, words, phrases, parts of speech, slang, etc. Examples of conceptually similar terms include synonyms, hypernyms, holonyms, hyponyms, merronyrns, coordinate terms, verb participles, troponyms, and entailments. Conceptually similar terms may be in the native language of the search (for example, English) and/or a foreign language (for example, Arabic, French, or Japanese). In one embodiment, a foreign language term may be a foreign language translation of a native language term related to a conceptual graph.

For example, a conceptually similar term for "person" is "human." Additional examples of conceptually similar terms for concept terms may include:

CST(Person): Individual, Religious individual, Engineer, Warrior, etc.

CST(Make): Building, Build, Create from raw materials, etc.

CST(Bomb): Explosive device, Car bomb, Pipe bomb, etc. Conceptually similar terms may also include foreign language terms, such as the following Arabic terms (English translation in parentheses):

CST(Person): صخش (Person), درف (Individual), ةينيد درف (Religious individual), سدنهملا (Engineer), ءاملا براحملا (Warrior), etc.

CST(Make): مقّت (Make), ءانب (Building), ينبي (Build), ماخلا داوملا نم قلخ (Create from raw materials), etc.

CST(Bomb): ةلبنق (Bomb), عبق ناسفن (Explosive device), ةخخفم ةرايس (Car bomb), ةيبوبنا ةلبنق (Pipe bomb), etc.

In particular embodiments, term expander 29 determines the semantic sense of terms. The semantic sense may be determined from the meaning of the term. For example, one or more word senses may be identified for a concept term. A word sense indicates the use of a term in a particular semantic context. For example, for the term "bomb," the word sense options may include "to bomb a test" and "to detonate a bomb." Term expander may retrieve word sense options from ontology 50. A word sense may be selected from word sense options automatically or by a user. A term may have multiple word senses of various types, such as a verb sense, a noun sense, etc.

In certain embodiments, term expander 29 identifies concept attributes (e.g., properties) for a concept term. Concept attributes may be identified based on the word sense for a term. Term expander 29 may utilize ontology 50 to identify a set of potential concept attributes for a term. For example, "abstract thinking," "alive," and "causal agent" may be identified as concept attributes for the concept type "person."

In certain embodiments, term expander 29 may include a Semantic Reverse Query Expander (SRQE), such as a Raytheon SRQE. In some embodiments, term expander 29 may utilize an ontology, WordNet®, a knowledge base, a cognitive model, or a psychological model to identify conceptually similar terms, attributes, relationships, and/or word senses.

Returning to FIG. 1, in certain embodiments, concept analyzer 38 performs formal concept analysis to validate terms. Formal concept analysis may be performed on concept types and conceptually similar terms to verify semantic alignment of concept types and conceptually similar terms. Formal concept analysis utilizes concept attributes to describe concepts to ensure semantic relevancy of concept types and conceptually similar terms. Concept analyzer 38 may check whether related terms are sufficiently related to a seed term (e.g., a concept term input) to validate the related terms. For example, in particular embodiments, concept analyzer 38 may check whether attributes mapped to a seed term are also mapped to terms related to the seed term (e.g., conceptually similar terms). Concept analyzer 38 may use matrices to check or validate mappings or relationships. In certain embodiments, related terms may be plotted along one dimension, and the attributes of the seed term may be plotted along another dimension. A cell may represent whether or not an attribute is mapped to a particular term. If the attribute is mapped to the term, the cell is marked. If the attribute is not mapped, the cell is left unmarked. A related term should have a satisfactory number (such as some, most, or all) attributes mapped to it.

Logic engine 34 may be utilized to reason about terms as they relate to other terms. In certain embodiments, logic engine 34 may validate attributes and/or representations of the concept term as suitable for association with the concept term. An affirmative validation may result in storing a mapping for appropriately related terms. For example, assume that "person" is entered as a concept term, and "face," "mortal," "soul," and "ape" are identified as potential concept attributes. Logic engine 34 contains axioms sufficient to reason that "a person has a soul," and accordingly this term may be validated, mapped, and/or otherwise stored. Logic engine 34 may also determine that "a person is not an ape," and thus "ape" may be rejected as an attribute for "person." If the representation is not validated, the term may be removed from the onomasticon and discarded. In certain embodiments, logic engine 34 may utilize an artificial intelligence. Logic engine 34, in certain embodiments, utilizes Cyc®.

Logic engine 34 may be used in formal concept analysis to define accurate concept type clusters and/or attribute clusters. For example, if "anomaly" was identified as a term representation for "person," and identified attributes for "person" include "causal agent," "soul," "alive," and "abstract thinking," the logic engine may include axioms to reason that not all "anomalies" are capable of abstract thinking, and in some instances do not contain a "soul" in the required sense. Based on this, "anomaly" may be removed from the onomasticon as a term representation for "person", as a member of a concept type cluster, since "anomaly" did not have the same attributes as "person."

In certain embodiments, a graph engine 30 may be utilized to create a conceptual graph representing terms, relationships, ideas, etc. A conceptual graph may be sent to a logic engine to make a conclusion on the truth of the conceptual graph. For example, a conceptual graph may be [Person: ?x]<-(AGNT)<-[Make]->(THME)->[Bomb: ?y]. In this instance, utilized logic may be "can a person make a bomb?" If yes, it may be determined that the conceptual graph is valid. If no, it may be determined that a conceptual graph is invalid. An invalid conceptual graph may be, for example: [Lion: ?x]<-(AGNT)<-[Make]->(THME)->[Bomb: ?y]. In such an instance, logic utilized may be "can a lion make a bomb?" The logic engine would not validate the graph, since a lion (animal) cannot make a bomb. In certain embodiments, logic engine 34 may include an intelligent agent or a logic engine such as Cyc®. Graph engine 30 may include a conceptual graph generator which utilizes an entity extractor, such as NetOwl®, to extract needed information to construct conceptual graphs. A conceptual graph context extractor is utilized to keep parts-of-speech (POS) positions for nouns and verbs.

Memory 28 includes ontology 50, onomasticon 54, and documents 58. Ontology 50 stores terms, conceptually similar terms (CSTs), term representations, term attributes, word senses (i.e., meanings, definitions), relationships among terms, and other appropriate data for the operations of system 10. Ontology 50 may be used (for example, by term expander 40) to determine terms, representations, attributes, word senses, and/or relationships. For example, ontology 50 may describe the semantically related terms of a term and the relationships that the term may have with other terms. Relationships may include synonyms, hypernyms, holonyms, hyponyms, merronyms, coordinate terms, verb participles, troponyms, and entailments. For example, ontology 50 may store the conceptually similar terms for "Person", "Make", and "Bomb" as described above. In certain embodiments, ontology 50 may comprise or utilize WordNet®, a knowledge base, a cognitive model, or a psychological model.

In particular embodiments, onomasticon manager 39 manages onomasticon 54. Onomasticon manager 39 may manage information in onomasticon 54 by performing any suitable information management operation, such as storing, modifying, organizing, and/or deleting information. For example, in particular embodiments, onomasticon manager 39 may perform the following mappings: a word sense of conceptually similar terms to a concept term, a set of conceptually similar terms to a word sense, and/or a concept attribute to a concept term. Onomasticon manager may generate matrices defining relationships between various terms, and may generate term clusters such as concept type clusters and attribute clusters. Onomasticon manager 39 may perform the operations at any suitable time, such as when information is generated or validated.

Onomasticon 54 may record information resulting from the operations of system 10. In certain embodiments, onomasticon 54 may store matrices defining relationships between various terms, and may store cluster data. Onomasticon 54 may store mappings of concept attributes, representations, conceptually similar terms, and relationship data to a concept term. Onomasticon 54 may contain individual "onomasticons" for various terms, representations, attributes, etc. Information in onomasticon 54 may be used for searches, in determining or expanding attributes, and in Formal Concept Analysis. Onomasticon 54 may store information regarding conceptually similar English and foreign language terms (e.g., Arabic terms) for a concept term. Onomastican 54 may additionally store relevant data in both English and in foreign language. Onomasticon 54 can access and provide matrices and mappings in analyzing terms and concept graphs, such as for formal concept analysis of terms and concept graphs.

A document 58 may refer to a collection of terms, and may be stored electronically. Documents 58 may include documents in a native language and/or a foreign language.

Components of system 10 may include an interface, logic, memory, and/or other suitable elements. An interface receives input, sends output, processes the input and/or output, and/or performs other suitable operation. An interface may comprise hardware and/or software. An interface may connect system 10 to a network. Logic may perform the operations of the component, for example, executing instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic. A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of onomasticon manager 39 may be performed by more than one component. Additionally, operations of system 10 may be performed using any suitable logic comprising software, hardware, and/or other logic.

In utilizing formal concept analysis in a process to semantically disambiguate concept types in English or a foreign language, sometimes there exists no attributes to serve as a basis for the analysis. Accordingly, particular embodiments provide for determining base concept attributes for concept terms in English and foreign language. Certain embodiments of system 10 provide for determining concept attributes for an input term, such as a concept term. For example, in certain embodiments, system 10 determines concept attributes for a concept term where such attributes may not be otherwise known or available. Certain embodiments may generate mappings and/or matrices to be stored in onomasticon 54 for providing concept attributes to serve as a basis in Formal Concept Analysis. In particular embodiments, system 10 may generate or determine concept attributes by determining, analyzing, and/or verifying related terms of the input term.

Figure 2:
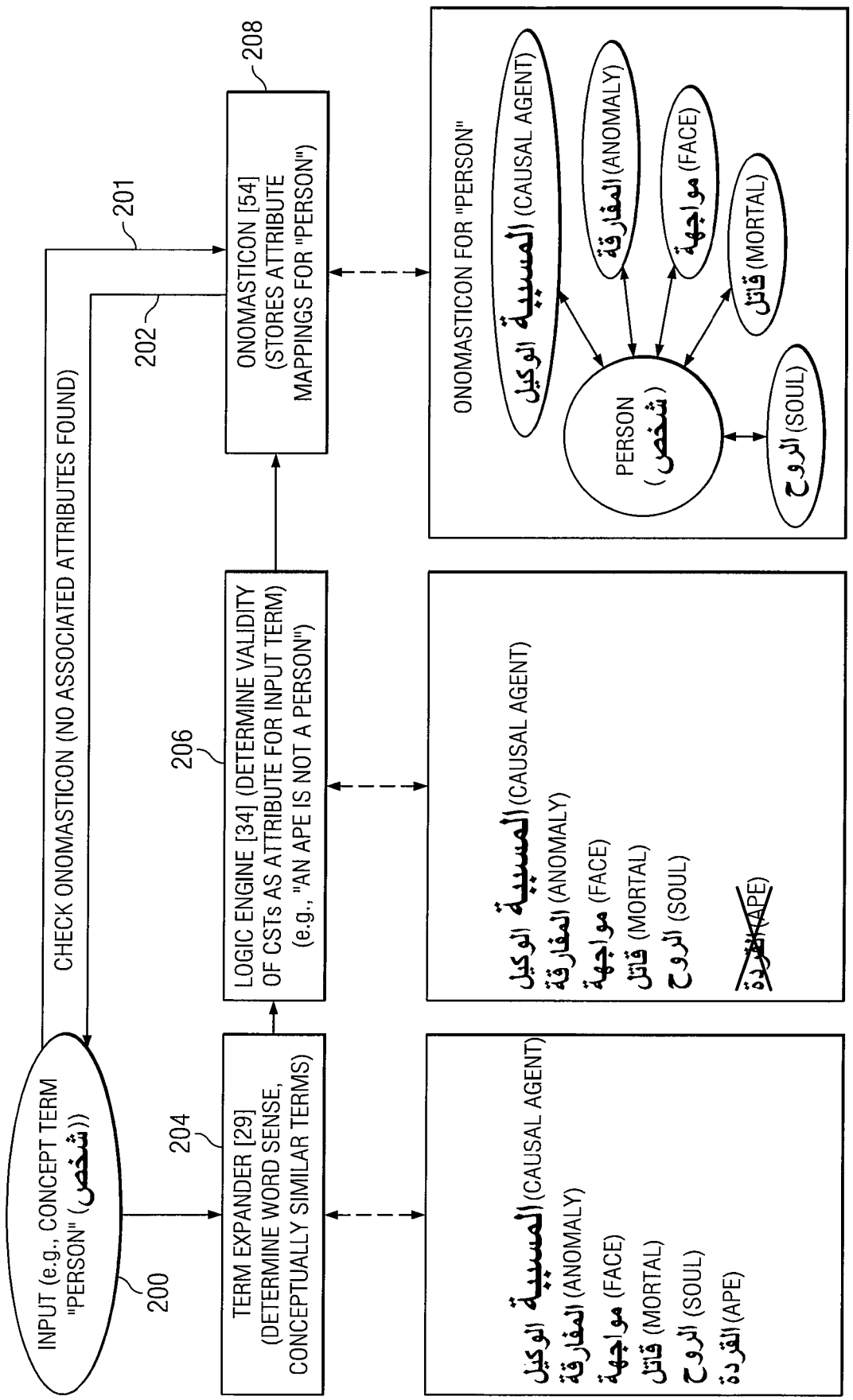
FIG. 2 illustrates one embodiment of a system determining attributes for an input.

FIG. 2 illustrates an example of how system 10 may determine concept attributes for a concept term. At step 200, an input is received. According to the example illustrated, the input is the concept term "person." At step 201/202, system 10 may check onomasticon 54 to determine whether the input has any associated mappings or matrices. In this example, it is determined that onomasticon 54 does not have any stored concept attributes associated with "person." At step 204, term expander 29 receives and analyzes the input. Term expander 29 may utilize a Raytheon SQRE to identify word senses. In the example, term expander 29 receives concept term "person" and accesses ontology 50 to identify one or more word senses (not shown). The user or an intelligent agent may select the appropriate word sense for "person," based on circumstances such as intended meaning, context in a document, etc. The noun sense "a human being" may then selected as the appropriate word sense, and conceptually similar terms may be identified based on that selection. After the appropriate word sense is identified, term expander 29 utilizes ontology 50 to identify one or more conceptually similar terms. Conceptually similar terms identified at this step may include synonyms, hypernyms, holonyms, hyponyms, merronyms, coordinate terms, verb participles, troponyms, and entailments for "person." In the illustrated example, "causal agent," "anomaly," "face," "mortal," "soul," and "ape" are identified as conceptually similar terms for "person." At step 206, logic engine 34 reasons about the suitability of each identified CST as an attribute for "person." For example, logic engine 34 (e.g., utilizing Cyc®) determines that "a person has a face," "a person is mortal," etc. However, regarding the concept attribute "ape," logic engine 34 determines that an ape is an animal and is not a person or a logical attribute for "person." Thus "ape" is not a suitable attribute for "person." Suitable attributes for the concept types are thus identified. At step 208, onomasticon 54 stores and/or updates a database with results, such as generating or updating a matrix comprising mappings which associate "person" with the attributes determined to be suitable. Note that similar expansion may be performed for terms in a foreign language (Arabic shown for example).

In another embodiment, all conceptually similar terms may be identified as concept attributes and mapped to the concept type in memory. Logic engine 34 may then determine if each mapping between the concept type and concept attributes is valid. If logic engine 34 determines the concept type contains the concept attribute in question, the concept attribute may remain in the onomasticon. For example, regarding the concept attribute "soul," the logic engine determines that "a person has a soul." The attribute mapping then remains in the onomasticon. If, however, logic engine 34 determines the attribute is not valid, the concept attribute is discarded along with the entry in onomasticon 54 and related mappings. For example, logic engine 34 determines that "an ape is not a person." Mapping information for "person" and "ape" may be removed from the onomasticon.

Utilizing formal concept analysis in a process to semantically disambiguate concept types in English or a foreign language may depend on the ability to accurately expand concept attributes in determining the validity of concept types and conceptually similar terms. Accordingly, certain embodiments provide for expanding concept attributes for concept types in English and foreign languages. In particular embodiments, system 10 expands concept attributes for an input. System 10 may expand an input term or by determining, analyzing, and/or verifying related terms. Results may be determined by user selection or automated selection, in some cases using ontology 50 and/or onomasticon 54. In certain embodiments, results may be mapped to specific terms and/or stored for future use in Formal Concept Analysis, logic engine, document queries, and the like. Expanded terms and/or mappings may be stored for future use in Formal Concept Analysis, or by the logic engine or in future queries.

Figure 3:
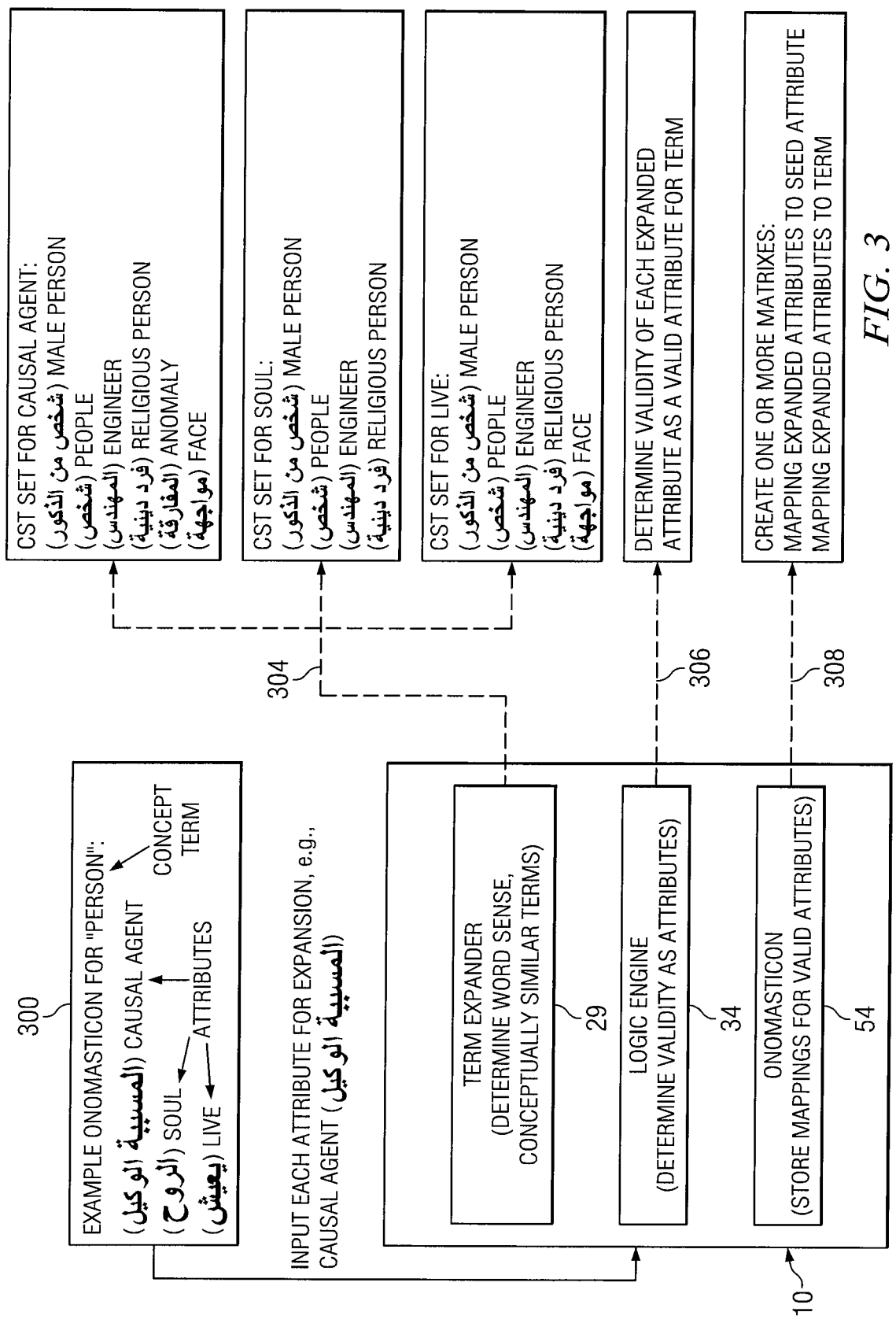
FIG. 3 illustrates one embodiment of a system expanding attributes for an input.

FIG. 3 illustrates an example of how system 10 may expand concept attributes for a concept term. At step 300, onomasticon 54 has an entry for the concept term "person" which includes the concept attributes "causal agent," "soul," and "live." At step 300, a concept attribute is selected for expansion. For example, "causal agent" may be selected for expansion by a user or automatically. At step 304, term expander 29 analyzes the selected concept attribute. For example, term expander 29 identifies a word sense for the selected attribute. Term expander 29 then determines an appropriate word sense (or receives a selected word sense from a user), and based on the appropriate word sense, identifies conceptually similar terms for "causal agent." The identified CSTs in the example include "Male Person," "People," "Engineer," "Religious Person," "Anomaly," and "Face." At step 306, logic engine 34 determines whether the attribute is suitable as a concept attribute for the concept term and/or suitable as an expanded attribute for the selected attribute. At step 308, onomasticon 54 stores matrices associating the concept term with the verified attributes and/or associating the verified attributes as expanded attributes for the selected attribute. The described expansion process may be repeated for each concept attribute (e.g., "soul" and "live"). In this manner, information for a concept term may be expanded to include additional attributes.

In another embodiment, all CSTs may be mapped to the selected concept attribute. Subsequently, logic engine 34 may then determine if each mapping is valid. Mappings for validated expanded attributes remain in the onomasticon, and expanded attributes which are not validated are removed, along with mapping information.

Figure 4:
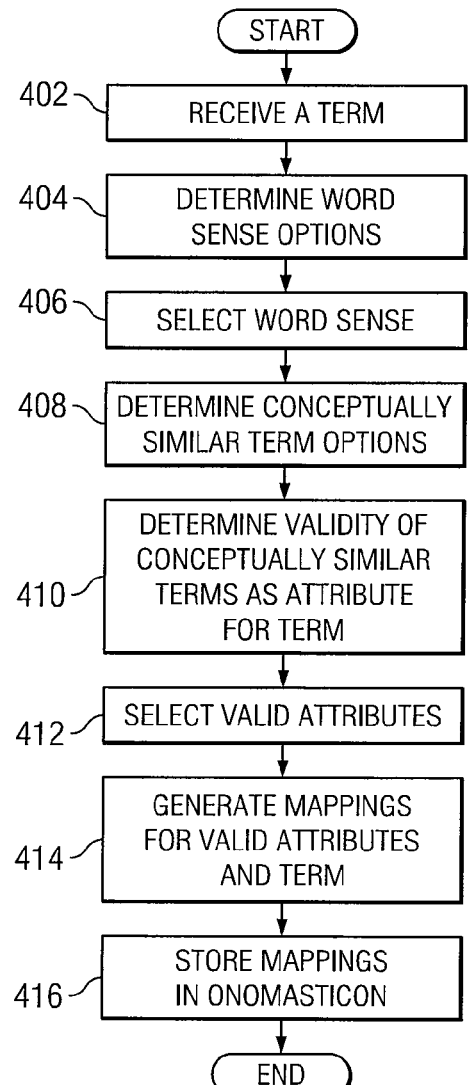
FIG. 4 illustrates an example of a method for determining attributes.

FIG. 4 illustrates a flow chart illustrating a method for determining attributes Formal Concept Analysis. At step 402, an input term is received. For example, the input term may be a concept term or term representation.

At step 404, one or more word sense options for the input term are determined. Ontology 50 (referencing a knowledge base, Wordnet®, etc.) may be used to identify word sense options.

At step 406, an appropriate word sense is selected. The appropriate word sense may be selected by a user or by automated selection. In certain embodiments, the appropriate word sense may be determined using information such as the term's context in a document or graph, or utilizing ontology 50. The appropriate word sense may be stored in memory.

At step 408, conceptually similar term options are determined for the concept term, based on the word sense. An SRQE may be utilized to identify and determine conceptually similar terms. In certain embodiments, conceptually similar terms may be retrieved from an ontology and/or onomasticon. An SRQE may retrieve conceptually similar terms with the same word sense as the concept term. One or more conceptually similar terms may be selected (by a user or automatically) which share the semantic concept of the concept term. In certain embodiments, native terms may be translated into foreign terms to obtain related foreign terms. Foreign terms may then be used to select related foreign terms. In certain embodiments, selected conceptually similar terms may be translated into a target language and reverse translated into English utilizing a translator.

At step 410, a logic engine such as Cyc® reasons about the suitability of identified conceptually similar terms as concept attributes for the concept term. In certain embodiments, related terms may be validated by determining whether attributes mapped to the seed term are also mapped to the conceptually similar terms.

At step 412, suitable conceptually similar terms may selected by a user or automatically. At step 414, corresponding mappings may be generated, and the mappings may be stored in an onomasticon at step 416. In certain embodiments, mappings may be generated for all CSTs prior to validation by the logic engine. Accordingly, validation may occur after expanded concept attributes are mapped in separate matrices to appropriate concept terms. In certain embodiments, a database may be modified in any suitable manner based on the results of the operations of system 10. In some embodiments, results may be displayed or provided to a user in any suitable manner, such as in a report.

Figure 5:
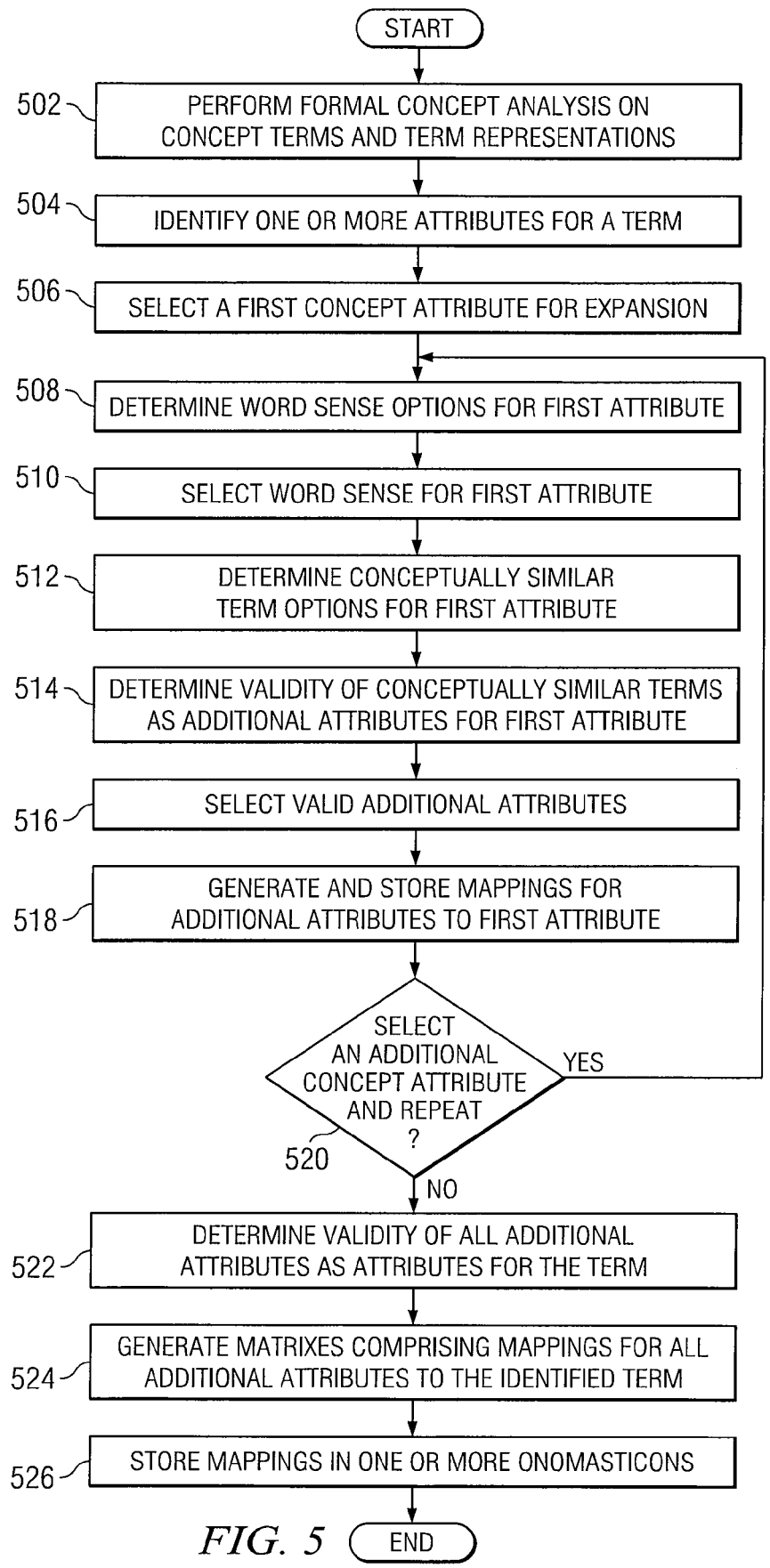
FIG. 5 illustrates an example of a method for expanding attributes.

FIG. 5 illustrates a flow chart in accordance with certain embodiments for expanding concept attributes for a concept type.

At step 502, formal concept analysis may be performed on all concept types and terms that represent concept types. An input may be specified by a user or received from a conceptual graph. FCA utilizes attributes to describe concepts to ensure semantic relevancy. For example, "abstract thinking," "alive," and "casual agent" might be attributes for the concept "Person" and all representations for "Person," such as "Individual," "Human," "Warrior," and "Religious Person." In conducting formal concept analysis, concepts and terms that represent concepts may be drawn from an ontology, Word- Net®, a knowledge base, etc. For example, attributes for "Person" might include "causal agent," "alive," "soul," and "can make bomb."

In certain embodiments, step 502 comprises several steps. In one example, an input concept term is received, and term expander 29 expands the concept term to determine term representations for the concept. For example, if the concept term is "person," the term expander 29 may identify "Individual," "Religious person," "Human," and "Warrior" as representations of the term. Identified term representations for the concept term are compared to known attributes for the concept term. For example, the term representations for "Person" ("Individual," "Human," "Warrior," and "Religious Person") are compared to the attributes for "person" ("causal agent," "alive," "soul," and "can make bomb"). All attributes that are mapped to the concept term should also be logically mapped to the term representations for the concept term. A logic engine, such as Cyc®, then reasons about the identified attributes for the concept term with respect to the term representations for the concept term to validate the term representation of the concept. If the representation is not validated, the term is removed from the onomasticon and discarded. For example, assume "anomaly" was identified a representation for "Person." If identified attributes for "Person" include "causal agent," "soul," "alive," and "abstract thinking," the logic engine utilizes axioms to reason that not all "anomalies" are capable of abstract thinking, and in some instances do not contain a "soul." Based on this, "anomaly" would be removed from the Onomasticon as a representation for "Person" since "anomaly" does not have the same attributes as "Person."

At step 504, attributes for a seed term (e.g., concept term) are identified. This may be done automatically, or by user selection. This step may be performed by referencing mappings in an onomasticon, or for a term without attributes, using results from the method described in FIG. 3.

At step 506, a first attribute is selected for expansion. The selection may be performed automatically or by a user. The first attribute may be sent to client 20 for expansion.

At step 508, one or more word sense options for the first attribute are determined. Ontology 50 (referencing a knowledge base, Wordnet®, etc.) may be used to identify word sense options.

At step 510, an appropriate word sense is selected for the first attribute. The appropriate word sense may be selected by a user or by automated selection. In certain embodiments, the appropriate word sense may be determined using information such as the term's context in a document or graph, or utilizing ontology 50. The appropriate word sense may be stored in memory.

At step 512, conceptually similar term options are determined for the first attribute, based on the selected word sense. An SRQE may be utilized to identify and determine conceptually similar terms. In certain embodiments, conceptually similar terms may be retrieved from an ontology and/or onomasticon. An SRQE may retrieve conceptually similar terms with the same word sense as the first attribute. One or more conceptually similar terms may be selected (by a user or automatically) which share the semantic concept of the first attribute. In certain embodiments, native terms may be translated into foreign terms to obtain related foreign terms. Foreign terms may then be used to select related foreign terms. In certain embodiments, selected conceptually similar terms may be translated into a target language and reverse translated into English utilizing a translator.

At step 514, a logic engine such as Cyc® reasons about the validity (i.e., suitability) of identified conceptually similar term options as additional attributes for the first attribute.

At step 516, valid additional attributes for the first attribute are selected by a user or automatically.

At step 518, mappings associating the validated additional attributes and first attribute may be generated, and the mappings may be stored in an onomasticon.

At step 520, a second (or third, fourth, etc) attribute may be selected for expansion. Steps 508-518 may be repeated to expand additional attributes.

At step 522, the validity of additional attributes as attributes for the seed term is determined. In certain embodiments, terms may be validated by checking whether expanded attributes mapped to the seed term are also mapped to conceptually similar terms or term representations for the seed term.

At step 524, matrices mapping each additional attribute to the seed term are generated. At step 526, such matrices are stored in an onomasticon. Original attributes for the seed term may be replaced, or they may be maintained in addition to expanded terms. Thus, in certain embodiments, expanded concept attributes are mapped to the seed term by creating separate matrices and replacing original concept attributes with expanded concept attributes in an onomasticon. Accordingly, attributes for the seed term are expanded. Additionally, expanded attributes are mapped to the concept attributes for the seed term, resulting in additional matrices in the onomasticon. Such matrices may comprise attribute clusters and concept type clusters, which provide for formal concept analysis utilizing clustering techniques associated with Galois lattices analysis tools. In certain embodiments, a database may be modified in any suitable manner based on the results of the operations of system 10. In some embodiments, results may be displayed or provided to a user in any suitable manner, such as in a report.

Note that in certain embodiments, validation may occur after mappings and matrices are generated. Also, in various stages of the method, native terms may be translated into foreign terms to obtain related foreign terms. Foreign terms may then be used to select related foreign terms (by a user or automatically). In certain embodiments, selected conceptually similar terms may be translated into a target language and reverse translated into English utilizing translator 60.

Modifications, additions, or omissions may be made to the disclosed methods without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method for determining concept attributes for a concept term, comprising:
   receiving a concept term;
   determining one or more word senses for the concept term;
   selecting a word sense from the one or more word senses, the selected word sense indicating a particular semantic context of the concept term;
   based on the selected word sense, determining one or more conceptually similar terms for the concept term;
   determining whether each of the determined conceptually similar terms is within the particular semantic context of the concept term as indicated by the selected word sense, each of the conceptually similar terms that are determined to be within the particular semantic context of the concept term being a suitable concept attribute for the concept term;
generating a mapping to associate the suitable concept attributes with the concept term;
accessing an onomasticon, the onomasticon comprising a plurality of terms and a plurality of attributes associated with the plurality of terms; and
storing the mapping in the onomasticon.

2. The method of claim 1, further comprising:
receiving a second term; and
in response to receiving the second term, accessing the generated mapping stored in the onomasticon.

3. The method of claim 1, wherein receiving a concept term comprises:
identifying a concept term;
determining that an onomasticon contains no concept attributes associated with the concept term; and
selecting the concept term.

4. The method of claim 1, further comprising using a logic engine to determine that at least one of the one or more conceptually similar terms is a concept attribute for the concept term.

5. The method of claim 1, further comprising using an ontology to determine one or more word senses for the concept term.

6. The method of claim 1, wherein determining one or more conceptually similar terms for the concept term comprises identifying at least one hyponym, hypernym, holonyms, meronym, coordinate term, verb participle, troponym, or entailment for the concept term.

7. The method of claim 1, further comprising using a semantic reverse query expander to determine the one or more word senses for the concept term and determine the one or more conceptually similar terms for the concept term.

8. The method of claim 1, wherein the one or more conceptually similar terms comprises at least one foreign language term comprising a foreign language translation of a native language term conceptually similar to the concept term.

9. A system for determining concept attributes for a concept term comprising:
a memory; and
logic stored in a computer readable medium and when executed by a computer configured to:
receive a concept term;
determine one or more word senses for the concept term;
select a word sense from the one or more word senses, the selected word sense indicating a particular semantic context of the concept term;
based on the selected word sense, determine one or more conceptually similar terms for the concept term;
determine whether each of the determined conceptually similar terms is within the particular semantic context of the concept term as indicated by the selected word sense, each of the conceptually similar terms that are determined to be within the particular semantic context of the concept term being a suitable concept attribute for the concept term;
generate a mapping to associate the suitable concept attributes with the concept term;
access an onomasticon, the onomasticon comprising a plurality of terms and a plurality of attributes associated with the plurality of terms; and
store the mapping in the onomasticon.

10. The system of claim 9 wherein the logic, when executed by the computer, is further configured to:
receive a second term; and
in response to receiving the second term, access the generated mapping stored in the onomasticon.

11. The system of claim 9, wherein receiving a concept term comprises:
identifying a concept term;
determining that an onomasticon contains no concept attributes associated with the concept term; and
selecting the concept term.

12. The system of claim 9, the logic further configured to access a logic engine to determine that at least one of the one or more conceptually similar terms is a concept attribute for the concept term.

13. The system of claim 9, the logic further configured to access an ontology to determine one or more word senses for the concept term.

14. The system of claim 9, wherein determining one or more conceptually similar terms for the concept term comprises identifying at least one hyponym, hypernym, holonym, meronym, coordinate term, verb participle, troponym, or entailment for the concept term.

15. The system of claim 9, the logic further configured to access a semantic reverse query expander to determine the one or more word senses for the concept term and determine the one or more conceptually similar terms for the concept term.

16. The system of claim 9, wherein the one or more conceptually similar terms comprises at least one foreign language term comprising a foreign language translation of a native language term conceptually similar to the concept term.

17. A computer-implemented method for determining concept attributes for a concept type, comprising:
identifying a concept term;
determining one or more word senses for the concept term;
selecting a word sense from the one or more word senses, the selected word sense indicating a particular semantic context of the concept term;
based on the selected word sense, determining one or more conceptually similar terms for the concept term;
utilizing a logic engine to determine whether each of the determined conceptually similar terms is within the particular semantic context of the concept term as indicated by the selected word sense, each of the conceptually similar terms that are determined to be within the particular semantic context of the concept term being a suitable concept attribute for the concept term;
in response to determining whether each of the determined conceptually similar terms is a suitable concept attribute for the concept term, generating a mapping associating the suitable concept attributes with the concept term;
accessing an onomasticon, the onomasticon comprising a plurality of terms and a plurality of attributes associated with the plurality of terms;
storing the mapping in the onomasticon;
receiving a request to analyze a concept graph; and
accessing the generated mapping in response to the request.

18. The method of claim 17, wherein the one or more conceptually similar terms comprises at least one foreign language term comprising a foreign language translation of a native language term conceptually similar to the concept term.

19. A system for determining concept attributes for a concept term comprising:

a memory; and logic stored in a computer readable medium and when executed by a computer configured to:

identify a concept term;

determine one or more word senses for the concept term;

select a word sense from the one or more word senses, the selected word sense indicating a particular semantic context of the concept term;

based on the selected word sense, determine one or more conceptually similar terms for the concept term;

access a logic engine to determine whether each of the determined conceptually similar terms is within the particular semantic context of the concept term as indicated by the selected word sense, each of the conceptually similar terms that are determined to be within the particular semantic context of the concept term being a suitable concept attribute for the concept term;

in response to determining whether each of the determined conceptually similar terms is a suitable concept attribute for the concept term, generate a mapping associating the suitable concept attributes with the concept term;

access an onomasticon, the onomasticon comprising a plurality of terms and a plurality of attributes associated with the plurality of terms;

store the mapping in the onomasticon;

receive a request to analyze a concept graph; and access the generated mapping in response to the request.

20. The system of claim 19, wherein the one or more conceptually similar terms comprises at least one foreign language term comprising a foreign language translation of a native language term conceptually similar to the concept term.

\* \* \* \* \*